May 7, 1963  H. R. KOENIG  3,088,894
CONFINEMENT OF HIGH TEMPERATURE PLASMA
Filed Dec. 23, 1960  3 Sheets-Sheet 2

INVENTOR.
HAROLD R. KOENIG
BY

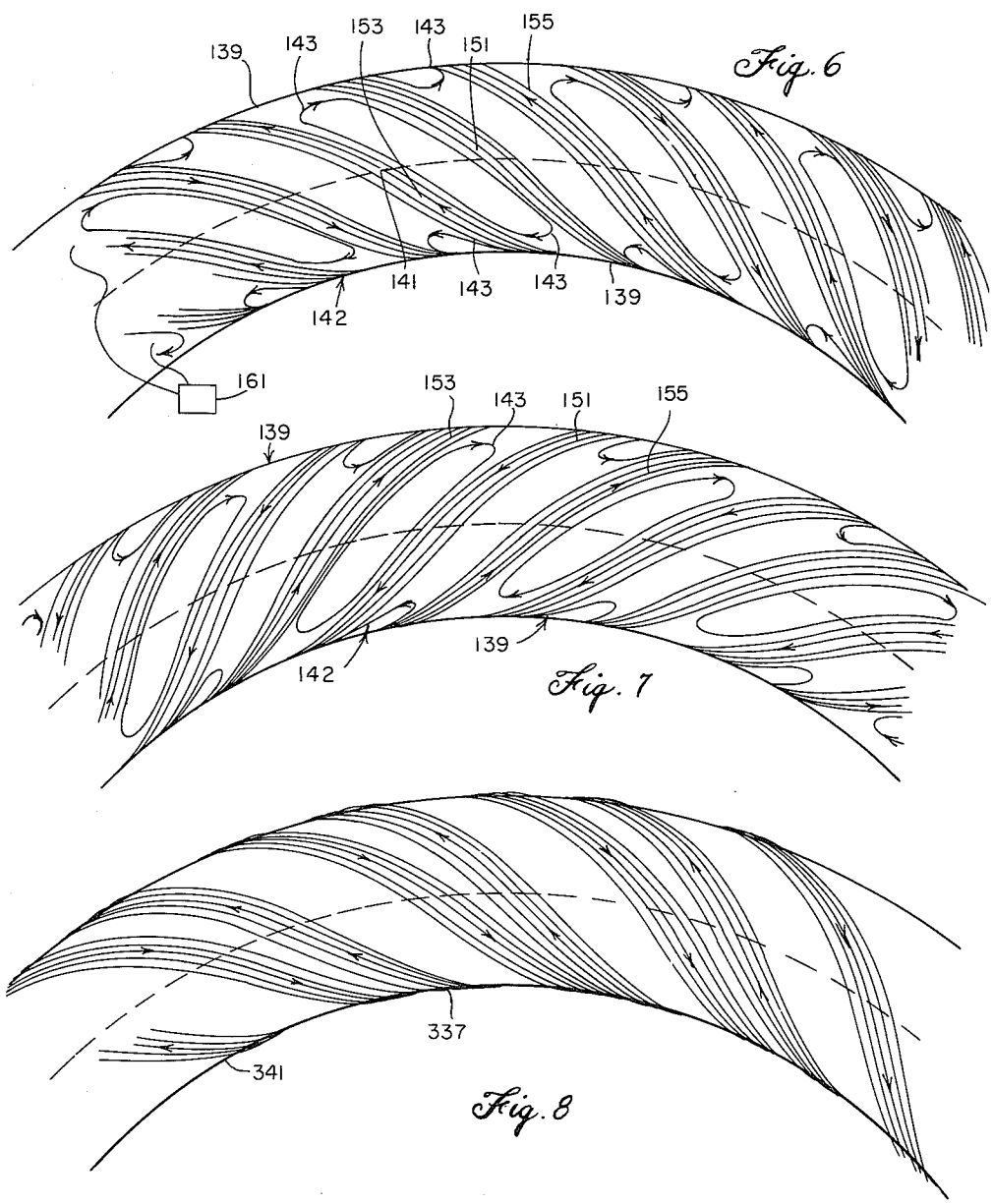

United States Patent Office
3,088,894
Patented May 7, 1963

3,088,894
CONFINEMENT OF HIGH TEMPERATURE PLASMA
Harold R. Koenig, Rotterdam, N.Y., assignor to the United States of America as represented by the United States Atomic Energy Commission
Filed Dec. 23, 1960, Ser. No. 78,194
6 Claims. (Cl. 204—193.2)

This invention relates generally to the heating of materials in the gaseous state, and more particularly to a method and apparatus for the production, confinement and utilization of high temperature plasmas of ions and electrons.

Apparatus and methods for heating gases to high temperatures have been useful in many different operations. As is well known, high temperatures have been instrumental in initiating chemical reactions between gaseous constituents that have been unreactive at low temperatures. This has been possible because the speed of reaction has been increased as the temperature of the gases has been increased. The production of high temperatures in gaseous materials has also been utilized in high temperature spectroscopy which has been a valuable tool both in basic research and in the control of industrial processes. Additionally, the production of high temperature gases has been useful in producing a high temperature plasma of ions and electrons. Such plasmas have been useful as electrical conductors, as research tools, and in development work directed toward the attainment of efficient thermonuclear power.

Devices contemplating the initiation of very high temperatures in gases for various of the uses mentioned above have been the high temperature stellarator apparatuses shown and described in co-pending applications Ser. No. 688,089 filed October 3, 1957 by Spitzer, now U.S. Patent 3,016,341, Ser. No. 705,071 filed December 24, 1957 by Spitzer, now U.S. Patent 3,002,912 and Ser. No. 745,778 filed June 30, 1958 by Stix, now U.S. Patent 3,015,618, all of which have been assigned to the assignee of this invention. The described stellarator apparatuses contemplate an evacuated container, such as an endless magnetically permeable tube in the shape of a torus or race course. A first means encircling the tube produces in the tube substantially cylindrical magnetic surfaces having a magnetic axis that corresponds with the axis or centerline of the tube and the magnetic surfaces are adapted to confine a plasma of ions and electrons established in the tube near the center of the tube. A conventional divertor has been operable to remove impurities from plasma confined near the center of the tube and a conventional ion cyclotron resonance heating means has been operable to heat plasma confined near the center of the tube.

At high temperatures the plasma behaves much like an ordinary gas and exerts an outward pressure whose magnitude increases directly with temperature and density. Thus $Pp=nkT$, where $n$ is the particle density, $T$ is the temperature in ° K. and $k$ is Boltzmann's constant. The mentioned magnetic surfaces produce an inward magnetic pressure advantageously greater than the plasma pressure so as to confine the plasmas sufficiently to impede the outward movement of plasma particles across the magnetic surfaces to the walls of the tube. The maximum inward pressure of the magnetic field is given by $B^2/8\pi$, where B is the magnetic field strength in gauss. The ratio of these two pressures is denoted by $\beta$, where $$\beta = nKT(B^2/8\pi)$$

The rate of energy generation in the stellarator is proportional to $n^2$ (and hence to $\beta^2$ from the above relation). Thus it is desirable to have as large a $\beta$ value as possible.

Under zero plasma pressure conditions, i.e., when $\beta=0$, the mentioned first means encircling the mentioned tube produce substantially concentric magnetic surfaces such as shown in FIG. 2. Heretofore, the introduction of plasma into the tube has caused the magnetic surfaces to distort so as to become unconcentric. Also, the magnetic surfaces have become unconcentric when the plasma pressure compared with the magnetic pressure as measured by the parameter $\beta$ has been increased as shown by a comparison of FIG. 2 with FIG. 3 where $\beta=2.5\%$. When $\beta$ has been increased sufficiently, the magnetic surfaces have distorted such that the divertor and the ion cyclotron resonance heating section have not operated satisfactorily and the plasma has been cooled by the walls of the tube.

It is an object of this invention, therefore, to provide means for overcoming the above-mentioned problems and for increasing the efficiency and effectiveness of high temperature plasma reactors.

It is a further object of this invention to provide means and a method in which plasma is produced, confined and heated to high temperatures while preventing the magnetic surfaces confining the plasma from shifting.

This invention contemplates in a high temperature method and apparatus of the type having means for confining a plasma, a novel means and method in which magnetic plasma confining surfaces are produced and maintained from shifting even as the $\beta$ values are increased. More particularly, in one of its embodiments, this invention contemplates substantially cylindrical magnetic plasma confining surfaces, a plasma in said surfaces and means for producing a cross field so as to prevent the shift of said magnetic surfaces by the introduction of plasma into said surfaces or by the change in the ratio of plasma pressure to magnetic pressure from one value to an increased value.

The above and further novel features and objects of this invention will appear more fully from the following detailed description when the same is read in connection with the accompanying drawings. It is to be expressly understood, however, that the drawings are not intended as a definition of the invention but are for the purpose of illustration only.

FIG. 4 is an expanded view of one of the end loops of the tube of FIG. 1.

FIG. 5 is a partial cross section through V—V of FIG. 4.

FIG. 6 is a partial isometric view of another embodiment of apparatus of this invention shown in FIG. 1.

FIG. 7 is a partial isometric view of the bottom of the apparatus of FIG. 6.

FIG. 8 is a partial isometric view of another embodiment of apparatus of this invention shown in FIG. 1.

Figure 1:
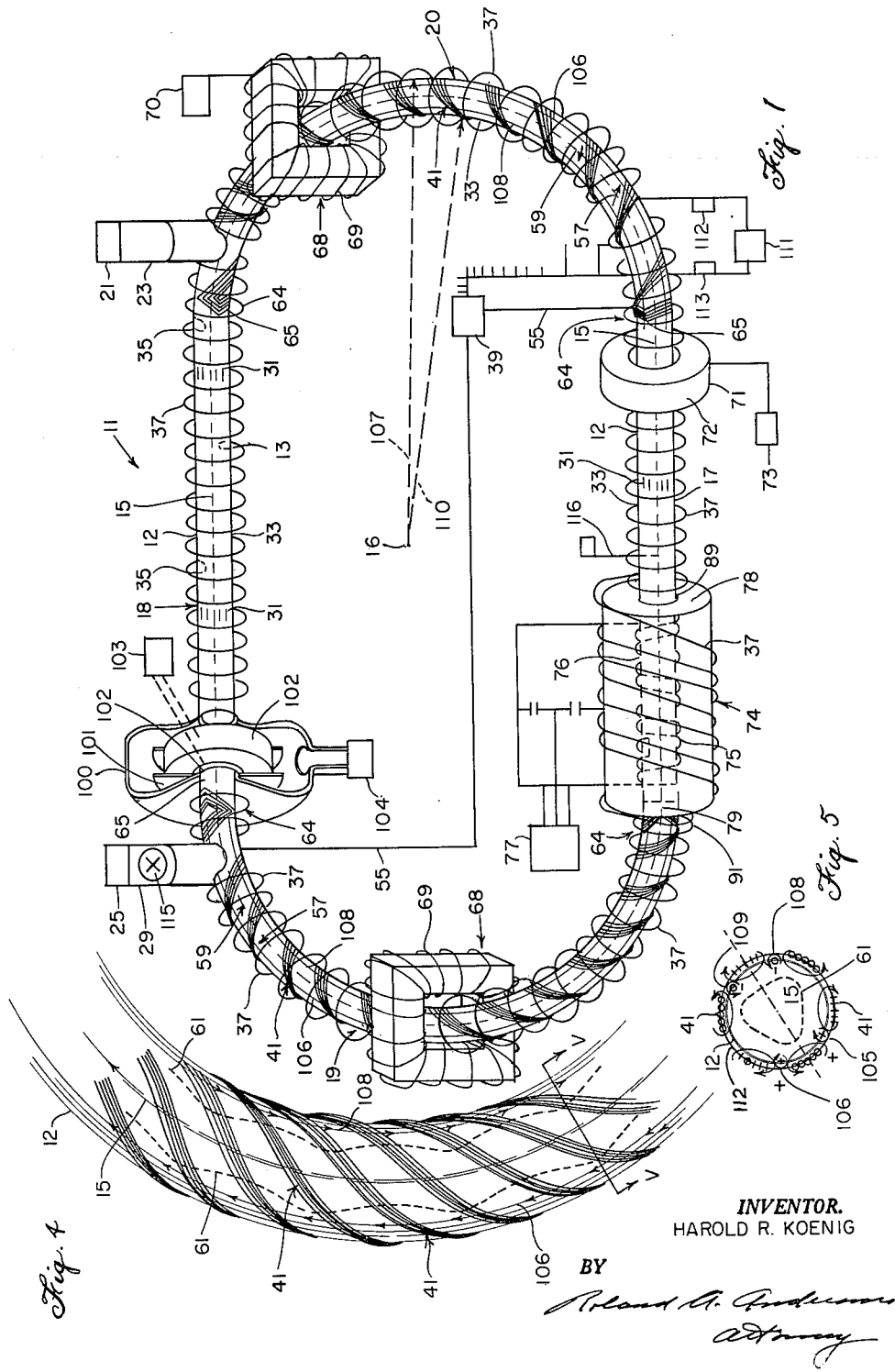
FIG. 1 is a partial isometric view of apparatus for confining and heating a plasma incorporating cross-field apparatus of this invention.

Referring to FIG. 1, a high temperature reactor 11 is shown that is particularly useful in raising gases to very high temperatures, producing reactions in the gaseous constituents that would not occur at low temperatures and producing heat as a source of mechanical power. The reactor has a tube 12 forming an endless tubular chamber 13 having an oval center line that is also described as an oval shaped planar chamber axis 15 encircling a point 16. The tube 12 is made of magnetically permeable material, advantageously principally stainless steel and has two straight sections, 17 and 18 and two U shaped sections, 19 and 20, joined to the ends of the straight sections 17 and 18. On the outside, the tube 12 has a conventional vacuum pump 21, which communicates with chamber 13 through duct 23, and a gas source 25 having deuterium or deuterium and tritium under pressure therein that communicates with chamber 13 through duct 29. A plurality of removeable electrical heaters 31, some of which are shown in FIG. 1, are supported by tube 12 and contact outside wall 33 of tube 12.

Figure 2:
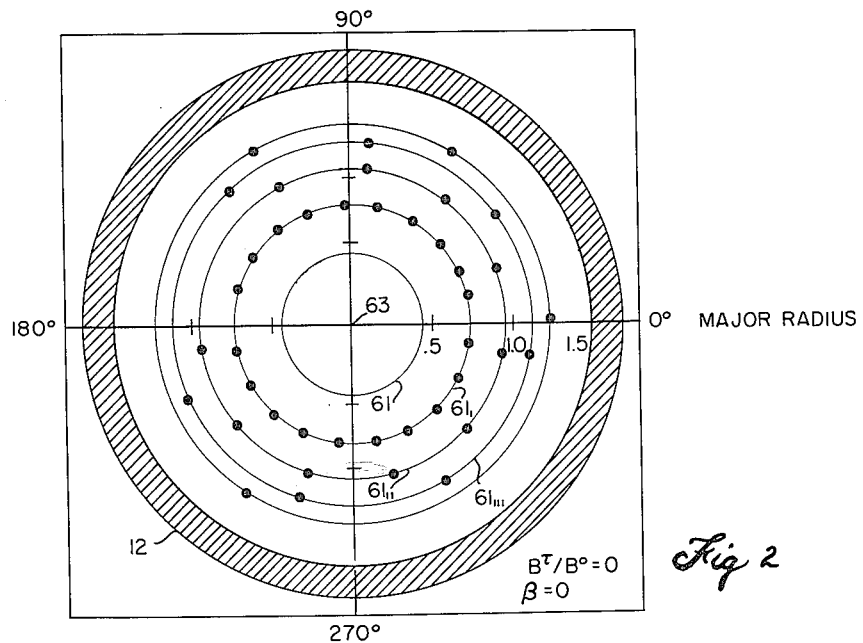
FIG. 2 is a schematic view of magnetic surfaces produced in the apparatus of FIG. 1 when no plasma pressure is present therein.

Tube 12 also supports coil 37 which encircles tube 12 substantially at right angles to axis 15 and extends longitudinally along substantially the entire outside length of the tube 12. A conventional direct current source 39 energizes coil 37 to produce a magnetic field in chamber 13. Helical coil 41 underlies coil 37, encircles tube 12 and extends longitudinally along substantially the length of curved tube sections 19 and 20. The sections of coil 41 shown in FIG. 1 advantageously have a conventional direct current source, such as source 39, that energizes alternate windings of the coil 41 through lead 55 in opposite directions such as shown by arrows 57 and 59 thus to cooperate with coil 37 to produce a magnetic field in tube 12 characterized by a rotational transform having a radial variation such as is well known in the art. Also, the field produced by coils 41 and 37 produce endless curved cylindrical magnetic surfaces extending longitudinally parallel with the axis 15 of chamber 13. Such magnetic surfaces are shown in FIG. 2 as concentric magnetic surfaces 61, 61', 61'', and 61''' encircling magnetic axis 63 also shown in FIG. 2.

The ends of the windings of each section of helical coil 41 have a circularizer 64 represented in FIG. 1 as substantially rectangular current loops. At the circular intersection (indicated by reference 65) of a plane with tube 12, each helical winding is bent to follow the line of the intersection. A portion of the ends of the windings of coil 41 along an intersection parallel to intersection 65 connects the ends of adjacent windings in pairs where they are bent to connect to the neighboring winding of coil 41.

An annular ring 68 also encircles tube 12. The ring 68 has an electrical winding 69 and a radiofrequency source 70 that flows radiofrequency current through winding 69 in a conventional manner ohmically to heat the plasma in tube 12. Ring 71 also encircles tube 12 and has an electrical winding 72 and an audio-frequency voltage source 73 that flows current through winding 72 to produce plasma from the gas in tube 12 by ionization. Resonance generating section 74 located around straight section 17 of tube 12 has an electrical coil 75 encircling an insulating tube 76 that forms a part of straight section 17 of tube 12. The coil 75 extends longitudinally along the outside of tube section 76 and the coil 75 has adjacent periodically oppositely directed windings that induce periodic adjacent fields in chamber 13 that are out of phase 180°. Radio frequency generating source 77 is adapted to energize the windings of coil 75 periodically with time near the ion cyclotron frequencies of the gas particles in chamber 13. Thereupon, if the magnetic surfaces 61 are properly centered in tube 12, the particles in tube 12 are resonated at their cyclotron frequencies in generating section 74 and thermalized to high temperatures in thermalizing sections 78 and 79 which are formed by gradually increasing spacings in portions of coil 37 adjacent generating section 74 as shown in FIG. 1. High temperature particles produced thereby are confined between magnetic pumping sections 89 and 91 of coil 37 formed by windings of coil 37 that are more closely spaced than in other sections thereof, e.g., around generating section 74, so as to produce a stronger field in pumping sections 89 and 91 than in generating section 74. These strong fields in pumping sections 89 and 91 tend to repel charged particles of plasma interposed therebetween so as to reflect charged particles back toward the center of generator 74. If the magnetic surfaces 61 are distorted sufficiently from their concentric condition shown in FIG. 2, as described above, the generator 74 does not operate adequately to raise the particles in tube 12 to high temperatures.

If the particles in tube 12 are heated sufficiently, neutrons are produced in generating section 74 by the heating of the plasma. The neutrons pass through tube 12 and are captured by a neutron moderator (not shown). A cooling means (not shown), circulated through the moderator by a suitable pump, circulates through a conventional turbine (not shown) that produces electrical or mechanical power.

Impure undesirable particles reduce the heating effect of generator 74 and sometimes occur in the plasma. These particles are removed from chamber 13 by a divertor 100 located in tube section 18. To this end, divertor 100 has a conductive collector plate 101 whose inner radius is at least as large as the minor radius of tube 12 and coils 102 that are energized by a direct current source 103 oppositely to the windings of coil 37 so as outwardly to bend the outer lines of force of the main confining magnetic field produced by coil 37 and the outer magnetic surfaces produced thereby. The outer lines of force and outer magnetic surfaces are bent outwardly into the divertor 100 through the collector plate 101 and the undesired impure particles that are adjacent to the wall 35 of tube 12 follow the magnetic lines into the divertor and the particles are captured by the collecting plate and removed therefrom by vacuum pump 104. If the magnetic surfaces are distorted outwardly far enough, as described, the divertor 100 does not operate satisfactorily and all of the plasma in tube 12 may be substantially completely diverted through divertor 100.

Figure 3:
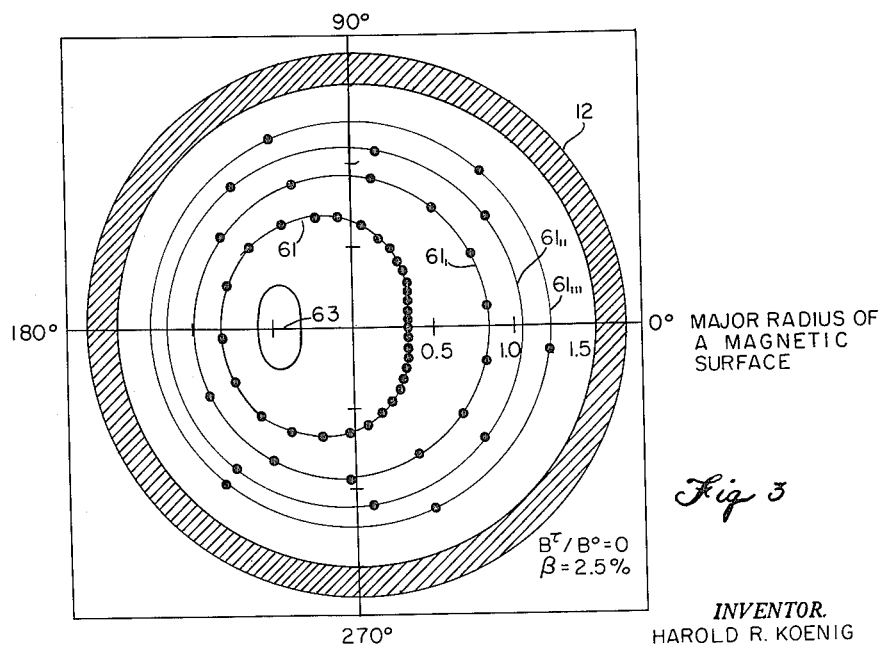
FIG. 3 is a schematic view of magnetic surfaces produced in the apparatus of FIG. 1 when plasma pressure is present therein and shows that a small increase in the ratio of plasma pressure to magnetic pressure from that of FIG. 2 causes a large change in position and concentricity of said magnetic surfaces, when the cross field apparatus of this invention shown in FIG. 1 is not in operation.

As described above, a plasma may be established in tube 12, and this plasma tends to cause the magnetic surfaces 61 produced by coils 37 and 41 to distort and to shift outwardly in a direction away from point 16 upon which the axis of chamber 13 is centered, e.g., outwardly from the position shown in FIG. 2 to the position shown in FIG. 3. This shift takes place in the straight sections of tube 12, as well as the end loops thereof. This shift occurs when the ratio of plasma pressure to magnetic pressure is increased by the increase in temperature of the plasma or increase in density of the plasma. When the magnetic surfaces 61 distort or shift outwardly far enough the plasma strikes the wall 35 of tube 12 thus cooling the plasma and preventing the efficient production of high temperatures in the plasma. Moreover, this shift causes the density of the gas in chamber 13 to be limited to a low figure and the low density requires a high power input for the production of plasma as well as the heating of the plasma.

In accordance with this invention, a transverse component is produced in tube 12 that causes the magnetic surfaces 61 to remain substantially without shifting when plasma is introduced into tube 12 and even when the ratio of plasma pressure to magnetic pressure is increased to high values. Thus, in accordance with this invention, plasma can be efficiently and unexpectedly heated to high temperatures at high densities. Such high temperatures and increased plasma densities result in the production of greater numbers of more energetic particles in the plasma. Moreover, if sufficiently high temperatures are produced in generating section 74, nuclei of the gas particles may come sufficiently close to each other with sufficient kinetic energies to overcome the tendency of the nuclei to repel each other and short-range nuclear forces thereupon may interact, permitting the particles to coalesce and release energy and neutrons.

Considering apparatus of this invention now as shown in FIGS. 1, 4 and 5, conductors 105 and 106 extend longitudinally along the outside of tube 12 adjacent the major radius 107 of curved tube portion 19 and 20 so as to be located in cross section, at uniform small angles above and below the plane of the axis of tube 12. Conductors 108 and 109 extend longitudinally along the inside of the outside wall of tube 12 adjacent the minor radius 110 of curved tube portion 19 and 20 so as to be located in cross section at uniform small angles above and below the plane of the axis 15 of tube 12. Conductors 105, 106, 108 and 109, as well as coils 37, 41 and 75, are located in cross section on concentric circles having axes that are substantially parallel with the center line of tube 12 upon which the axis of tube 12 lies as shown in FIG. 4. Direct current source 111 directs current in one direction in conductors 105 and 106 and in the opposite direction in conductors 108 and 109 so as to produce a cross field in chamber 13 and provides a transverse component to the field produced by coil 37. To provide a uniform cross field the longitudinal current should be a cylindrical current sheet 112 the sheet represented by the surface on which the longitudinal conductors 105, 106, 108 and 109 are drawn in FIG. 5. The magnitude of current per unit of arc, in the current sheet measured from the center line and in a plane perpendicular to it, are at a maximum on the inner and outer radii and vary as the cosine of the angle so as to be zero at the top and bottom of the sheet. The field or component produced by conductors 105, 106, 108 and 109 is adjusted by suitable means such as autotransformers 113 and 112 to maintain the field strength therefrom in a constant ratio to the high strength longitudinal field produced by coil 37. Thus, the cross field of this invention unexpectedly has great flexibility for adjusting magnetic surfaces, such as surface 61, and to this end the cross field produced by conductors 105, 106, 108 and 109 can be adjusted independently of the longitudinal field produced by coil 37 and the helical field produced by coil 41.

In operation pump 21 evacuates tube 12 to about $2 \times 10^{-10}$ millimeters of mercury and the tube is baked for about 12 hours at 450° C. by heaters 31 to remove impurities from chamber 13 through pump 21. Then, tritium and deuterium gas from source 25 enter tube 12 through inlet 29 by means of a valve 115 until the pressure in tube 12 is about $2 \times 10^{-8}$ or more. Direct current source 39 energizes coil 37, the thermalizing sections 78 and 79 thereof and the magnetic mirror section 89 and 91 thereof which are both parts of coil 37. Direct current source 39 also energizes helical coil 41 to produce resultant stable substantially cylindrical magnetic surfaces 61. The coil 41 provides a twist with a shear to the original field lines of adjacent magnetic surfaces 61 produced by coil 37. Thus, lines of force are provided by coil 41 and coil 37 which do not easily interchange position resulting in uniformly stable magnetic surfaces 61 which confine the plasma in tube 12.

Rings 68 and 71 are adapted to ionize and heat the gas in tube 12 but advantageously radio-frequency source 77 can energize coil 75 in generating section 74 alone to transform the gas in tube 12 into a plasma of ions and electrons. To this end the radio frequency source 77 is resonated by suitable means (not shown) near the ion cyclotron frequencies of the gas in tube 12 to produce ion cyclotron motions and complete ionization of the gas and also ion cyclotron waves in the gas that are thermalized along with the ion cyclotron motions in thermalizing sections 78 and 79 by cyclotron damping. This feature is understood from the fact that ions have a transverse gyration in a confining magnetic field called the "ion cyclotron motion." The term "ion cyclotron wave" refers to the natural oscillations of wave in a plasma which is confined in a confining magnetic field. The ion cyclotron waves are excited in the plasma by resonating coil 75 to produce a field having frequencies slightly below the ion cyclotron frequency and this accelerates the ions for relatively long periods of time. Since coil 75 has periodic oppositely directed windings the field produced thereby has a spatial periodicity along its lines of force that prevents a space charge from arising in the plasma and permits ions in the plasma to be heated to very high temperatures by radio frequency resonating means when the magnetic surfaces are sufficiently prevented from being distorted.

Coils 102 of divertor 100 are energized from source 103 to remove undesired ions from the gas in tube 12 and other undesirable particles in the tube including those produced by the bombardment of wall 35 of tube 12 by energetic particles in tube 12 and the divertor operates satisfactorily when the magnetic surfaces are sufficiently prevented from being distorted.

Direct current source 111 energizes conductors 105 and 106 in one direction and conductors 108 and 109 in the opposite direction to produce a cross field in tube 12 that substantially prevents the magnetic axis 63 from shifting in both the straight and curved sections of tube 12. Transformers 112 and 113 are adjusted independently of the current in coils 37 and 41 until the current in conductors 105, 106, 108 and 109 is sufficient to maintain the magnetic surfaces 61 in a stationary position regardless of the ratio of plasma pressure to magnetic pressure. Sufficient current in conductors 105, 106, 108 and 109 is determined to be present when conventional high temperature probe 116 shows the presence of the desired temperature and plasma density. The amount of current necessary in conductors 105, 106, 108 and 109 can also be calculated, and according to calculations, the amount of current is advantageously a fraction of the current in coil 37. For the case shown in FIG. 3, the magnetic surfaces 61, 61′, 61″ and 61‴ are shown when a field transverse to the plane of the axis 15 of tube 12 with $B^T/B° = 1/p = 5\%$ is present and where $B^T =$ the transverse magnetic field generated by conductors 105, 106, 108 and 109, $B° =$ the longitudinal magnetic field generated by coils 37, and $p =$ the pitch of conductors 41. With the cross field of this invention both the $\beta = 0$ and the $\beta = 2.5\%$ cases are represented by FIG. 3 as such a change in pressure has no effect on the configuration of any of the magnetic surfaces 61.

In another aspect of this invention, as will be understood from the above, a method is contemplated in which a plasma of ions and electrons is produced in an endless tube such as tube 12, the plasma is confined by substantially cylindrical magnetic surfaces in the tube about an axis corresponding to the center line of the tube, for example, by coils 37 and 41. The plasma is heated in the tube as by generator 74 and a magnetic field substantially transverse to the first field is produced in the tube that prevents the magnetic surfaces within which the plasma is confined from shifting as plasma is established in the tube or as the ratio of plasma pressure to magnetic pressure is increased. More particularly, the method of this invention contemplates the above steps in which the last mentioned step comprises introducing a cross-field into the tube longitudinally along the axis of the curved portions of the tube such as by longitudinal conductors such as conductors 105, 106, 108 and 109.

Another embodiment consists of setting all main field coils 37 in curved sections 19 and 20 at an appropriate uniform small angle with respect to the plane containing axis 15 of the tube 12. In this embodiment, coils 37 set at an angle as described serve the functions of coils 37 and coils 105, 106, 108 and 109 in the above-described embodiment.

Referring now to FIGS. 6 and 7, another embodiment is shown which produces the cross field of this invention. In this embodiment, the main confining coil (not shown) encircles curved portions of a tube 139 having an oval axis 141 in a plane. This coil is identical in description and arrangement to coil 37 described above, but for the sake of simplicity of explanation, this coil is not shown in FIGS. 6 and 7. This coil, as described above, produces a high strength longitudinal field in tube 139 which is of similar description and operation to tube 12 described above. Coil 142 is like coil 41 described above such that coil 142 provides a rotational transform as described above. In addition, coil 142 provides the cross field of this invention. To this end coil 142 incorporates the current of coil 41 and conductors 105, 106, 108 and 109. Also, coil 142 has loops 143 that connect adjacent alternate windings of the coil 142, portions only of which are shown around the curved portion of tube 139 for the sake of simplicity of explanation. Each section advantageously has five windings and is spaced from adjacent sections as shown in FIGS. 6 and 7. For example, section 151 of coil 142 has five windings and is spaced from sections 153 and 155 of coil 142 and each section is connected to the next adjacent section by a loop 143. Direct current source 161 applies current to coil 142 so that the current flows oppositely in adjacent sections of coil 142 to produce sufficient cross field to prevent the magnetic surfaces produced in tube 139 from shifting when there is an increase in the ratio of plasma pressure to magnetic pressure produced in tube 139.

In still another embodiment of this invention coil 337 shown in FIG. 8 is substituted for coil 142 of FIGS. 6 and 7 and the windings of coil 337 are spaced as shown in FIG. 8 so as substantially to combine the currents of coil 41, 105, 106, 108 and 109. The advantages incorporated in the coil of FIG. 8 over the coil 142 of FIGS. 6 and 7 are mechanical simplicity as a result of eliminating the short closed current loops.

It is understood from the above that this invention also provides apparatus and method for confining a plasma that is heated by the described or other high temperature plasma heating means.

This invention provides a method and apparatus for producing a plasma of ions and electrons for confining a plasma of ions and electrons, for heating a plasma to high temperatures, and obtaining useful power therefrom, in which a plasma confining magnetic field forming cylindrical magnetic surface along an axis in a curved tube is produced and means are provided for preventing the axis from shifting as the ratio of plasma pressure to magnetic pressure is increased whereby the plasma can be heated to higher temperatures at higher plasma densities and higher efficiencies than was possible heretofore.

I claim:

1. In a high temperature reactor for producing a high temperature plasma, of the type having in a plane an endless toroidal magnetically permeable tube forming an annulus bounded by straight and connecting looped tube portions, means having an axial and helical coil for establishing in said tube substantially cylindrical magnetic surfaces adapted to produce an inward magnetic pressure along an axis corresponding to the axis of said tube, means for introducing into said tube a plasma that exerts an outward pressure whose magnitude toward said magnetic surface increases directly with plasma temperature and density, said plasma pressure having a ratio with said magnetic pressure denoted by the symbol $\beta$, which when increased in value tends to shift said magnetic surfaces in a direction outwardly from the center of said tube, and means for heating said plasma, the improvement in said reactor comprising means for introducing into said looped tube portions a magnetic field that is at right angles to the plane of said tube and extends longitudinally along the axis of said tube, thereby to overcome the tendency of said magnetic surfaces to shift outwardly in said tube when the value of $\beta$ is increased whereby said plasma can be heated effectively to high temperatures at increased $\beta$ values by said heating means.

2. In a high temperature reactor for producing a high temperature plasma, of the type having in a plane an endless toroidal magnetically permeable tube forming an annulus bounded by straight and connecting looped tube portions, magnetic field means having an axial and helical coil for establishing in said tube substantially cylindrical magnetic surfaces adapted to produce an inward magnetic pressure along an axis corresponding to the axis of said tube, said magnetic field means having an electrical first coil which encircles said tube substantially at right angles to the axis of said tube and extends longitudinally along substantially the entire outside length of said tube, said electrical first coil having a direct current source for energizing said first coil to produce a high strength longitudinal magnetic field in said tube, means for introducing into said tube a plasma that exerts an outward pressure whose magnitude toward said magnetic surface increases directly with plasma temperature and density, said plasma pressure having a ratio with said magnetic pressure denoted by the symbol $\beta$ which when increased in value tends to shift said magnetic surfaces in a direction outwardly from the center of said tube, and means for heating said plasma, the improvement in said reactor comprising two spaced apart longitudinal first conductors on the outside of said looped tube portion which in cross section lie on opposite sides of the major radius of said tube, two spaced apart longitudinal second conductors on the inside of said looped tube portion which in cross section lie on opposite sides of the minor radius of said tube, and means for variably adjustably energizing said first conductors with direct current in one direction and said second conductors with direct current in the opposite direction so as to overcome the tendency of said magnetic axis to shift outwardly when the value of $\beta$ is increased whereby said plasma can be heated effectively to high temperatures at increased B values by said heating means, the longitudinal current in said conductors being less than the current in said first coil.

3. In a method for producing a high temperature plasma of ions and electrons which has the steps of maintaining an endless toroidal tube at about $2 \times 10^{-10}$ millimeters of mercury, baking said tube about 12 hours at 450° C., introducing tritium and deuterium gas into said tube to a pressure of about $2 \times 10^{-8}$ millimeters of mercury, producing substantially cylindrical first magnetic field surfaces in said endless toroidal tube having looped end portions, and establishing a high temperature plasma in said tube from said gas, said plasma tending to shift said magnetic axis outwardly against the inside wall of said tube as the ratio of plasma pressure to magnetic pressure is increased, the improvement in said method, comprising the step of introducing a second magnetic field into said tube with a transverse component at right angles to the axis of said looped end tube portions as said plasma is established in said tube including maintaining the ratio in said first and second magnetic fields constant and said second magnetic field at a fraction of said first magnetic field with autotransformers connected to separate power source so as to prevent said magnetic surfaces from shifting outwardly as said plasma is established whereby said plasma can be effectively heated to increased temperatures at increased ratios of plasma pressure to magnetic pressure.

4. Apparatus for confining a high temperature plasma at high plasma densities, comprising magnetic field means having an axial and helical coil producing substantially cylindrical longitudinally extending magnetic surfaces having an inward magnetic pressure, said magnetic field means having an electrical first coil which encircles said tube substantially at right angles to the axis of said tube and extends longitudinally along substantially the entire side length of said tube, said electrical first coil having a direct current source for energizing said first coil to produce a high strength longitudinal magnetic field in said tube, means for establishing a high temperature plasma of ions and electrons in said surfaces, and longitudinally extending parallel electrical conducting means for producing a selectively variable adjustable field with a transverse component to said surfaces substantially at right angles thereto so as to prevent said magnetic surface from shifting when said plasma is introduced into said surface and when the ratio of plasma pressure to magnetic pressure is increased, the longitudinal current in said longitudinal second conducting means being less than the current in said coil, and the field produced by said first coil and second conducting means being in a constant ratio.

5. Apparatus for confining a high temperature plasma at high plasma densities, comprising magnetic field means having an axial and helical coil for producing substantially cylindrical longitudinally extending magnetic surfaces having an inward magnetic pressure and a curved axis in a plane that corresponds with a line centered in said surfaces, said magnetic field means having an electrical first coil which encircles first tube substantially at right angles to the axis of said tube and extends longitudinally along substantially the entire outside length of said tube, said electrical first coil having a direct current source for energizing said first coil to produce a high strength longitudinal magnetic field in said tube, means for establishing a plasma of ions and electrons in said surfaces, two spaced apart longitudinal first conductors on the outside of said surfaces adjacent opposite sides of the major radius of said surfaces at uniform small angles to the plane of said axis, two spared apart second conductors on the inside of said surfaces adjacent opposite sides of the minor radius of said surfaces at uniform small angles to the plane of said axis, said conductors being located in cross section on a circle concentric with said first coil, and means for variably energizing said first and second conductors oppositely whereby a magnetic field is produced transverse to said surface that prevents said magnetic surface from shifting when said plasma is introduced into said surface and when the ratio of plasma pressure to magnetic pressure is increased, the longitudinal current in said first and second conductors being less than the current in said first coil and providing in cross section a cylindrical current sheet in which the magnitude of the current per unit of arc measured perpendicularly from said axis is at a maximum on the inner and outer radii and vary as the cosine of the angle so to be zero at the top and bottom of the sheet, and the fields produced by current flow in said first coil and said conductors is in a constant ratio.

6. Apparatus for confining a high temperature plasma at high plasma densities, comprising an endless planar toroidal tube having curved end loops and means for baking said tube to a high temperature, means for evacuating said tube, means for introducing a mixture of tritium and deuterium into said tube, a first axial confining coil which encircles said tube substantially at right angles to the axis of said tube and extends longitudinally along substantially the entire outside length of said tube for producing a high strength longitudinal first field in said tube, helical second windings underneath said first windings and extending longitudinally along substantially the entire length of said curved end loops for providing a rotational transform to said first field, longitudinal third conductors on the outside of said tube at a small angle on opposite sides of the plane of said tube, longitudinal fourth conductors on the inside of said tube at the same small angle to said plane, a current source for energizing said conductors including means for independently, oppositely and variably adjustably energizing said third and fourth conductors with a fraction of the current in said first conductor, and means for ionizing said gas to form a plasma in said first magnetic field, said third and fourth conductors preventing said plasma from shifting said first field and the plasma contained therein toward the walls of said tube along the length of said end loops.

References Cited in the file of this patent

UNITED STATES PATENTS

| 3,002,912 | Spitzer | Oct. 3, 1961 |
| 3,012,955 | Kulsrud et al. | Dec. 12, 1961 |
| 3,015,618 | Stix | Jan. 2, 1962 |

FOREIGN PATENTS

| 1,185,102 | France | Feb. 9, 1959 |
| 838,117 | Great Britain | June 22, 1960 |
| 852,897 | Great Britain | Nov. 2, 1960 |